United States Patent [19]

Perego

[11] Patent Number: 5,118,045
[45] Date of Patent: Jun. 2, 1992

[54] CONTINUOUS FEED AND DISCHARGE FLOW THROUGH CASSETTE LOADING APPARATUS AND SYSTEM

[75] Inventor: Luciano Perego, Mezzago, Italy

[73] Assignee: Tapematic U.S.A., Inc., Orlando, Fla.

[21] Appl. No.: 479,231

[22] Filed: Feb. 12, 1990

Related U.S. Application Data

[63] Continuation of Ser. No. 314,409, Feb. 22, 1989, abandoned.

[30] Foreign Application Priority Data

Dec. 29, 1988 [IT]  Italy ............................... 23152 A/88

[51] Int. Cl.⁵ .......................................... B65H 54/22
[52] U.S. Cl. .................................................. 242/56 R
[58] Field of Search ........... 242/56 R; 198/457, 467.6; 414/222

[56] References Cited

U.S. PATENT DOCUMENTS

| | | | |
|---|---|---|---|
| B535,448 | 3/1976 | King ................................. | 242/56 R |
| 3,940,080 | 2/1976 | Bennett .......................... | 242/56 R X |
| 4,061,286 | 12/1977 | King, Sr. et al. .............. | 242/58.4 X |
| 4,136,838 | 1/1979 | Bosco .............................. | 242/56 R |
| 4,332,355 | 6/1982 | Zopfy et al. .................... | 242/56 R |
| 4,486,262 | 12/1984 | Woodley ........................ | 242/56 R X |
| 4,519,553 | 5/1985 | Campbell et al. ............... | 242/56 R |
| 4,589,608 | 5/1986 | Rehklau et al. ............. | 242/56 R X |
| 4,595,327 | 6/1986 | Woodley ....................... | 242/56 R X |
| 4,602,748 | 7/1986 | Woodley ......................... | 242/56 R |
| 4,629,138 | 12/1986 | Kubo .............................. | 242/56 R |
| 4,657,197 | 4/1987 | Farrow ............................ | 242/56 R |
| 4,699,328 | 10/1987 | Kreeft et al. ................... | 242/56 R |
| 4,738,408 | 4/1988 | Odaka et al. ................. | 242/56 R X |

FOREIGN PATENT DOCUMENTS

| | | | |
|---|---|---|---|
| 2834598 | 2/1979 | Fed. Rep. of Germany .... | 242/56 R |
| 2093801 | 9/1982 | United Kingdom ............. | 242/56 R |

Primary Examiner—Daniel P. Stodola
Assistant Examiner—John P. Darling
Attorney, Agent, or Firm—Edgar H. Haug; Adam L. Brookman

[57] ABSTRACT

Cassettes are released from a remote loading station onto a supply conveyor. The cassettes travel on the supply conveyor to a flow-through tape loading machine in a response to a request from the tape loading machine. The cassettes are transported through the tape loading machine from the back to the front. The cassettes are moved across the face of the machine where they are loaded with tape. The cassettes are then transported back through the machine to a discharge conveyor. The cassettes are removed from the discharge conveyor at a remote packing station. The packing can be done either manually or automatically.

52 Claims, 5 Drawing Sheets

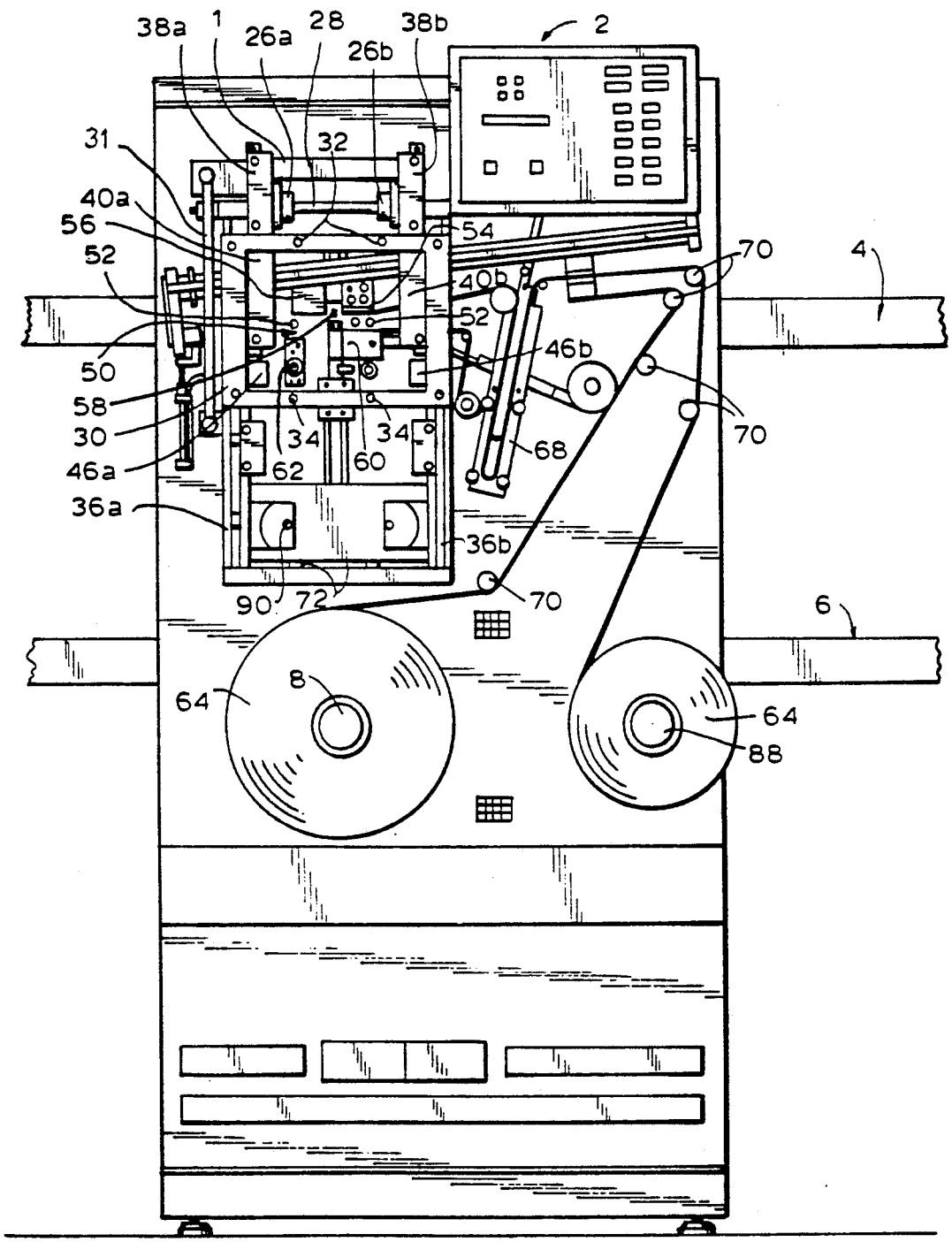
F I G. 1

CONTINUOUS FEED AND DISCHARGE FLOW THROUGH CASSETTE LOADING APPARATUS AND SYSTEM

This application is a continuation of application Ser. No. 07/314,409, filed Feb. 22, 1989, abandoned.

BACKGROUND OF THE INVENTION

1. Field of the Invention

The instant invention relates generally to machines and systems for loading tape into cassettes and, more particularly, to flow through cassette loading machines and systems having continuous cassette input and continuous cassette discharge capabilities.

2. Description of the Prior Art

Equipment for automatically winding blank or pre-recorded magnetic tape into a cassette, for instance, an audio cassette or video cassette, is known. Such devices are disclosed in U.S. Pat. Nos. 3,997,123 and 3,814,343.

Typically, blank or pre-recorded magnetic tape is provided on a supply reel or "pancake", which is mounted on a hub on the cassette loading machine. The blank or pre-recorded tape on the pancake is commonly referred to as "use tape".

A cassette, prior to loading, generally has two hubs located inside a plastic casing, connected by a leader. An empty audio cassette is called a C-0 and an empty video cassette is called a V-0. Empty cassette are manually or automatically fed into a tape loading station of the cassette loading machine to begin the tape loading operation. A portion of the leader of the empty cassette is extracted from the cassette and cut into two pieces by a cutter mechanism. Use tape from the pancake is spliced to one of the ends of the two cut leader pieces, and a pre-determined length of the use tape is wound onto the associated cassette hub by a winding spindle. For instance, enough blank use tape for 30, 60, 90 or 120 minutes of recording time may be wound onto the cassette hub. Alternatively, a portion of use tape containing a pre-recorded program (e.g., a record album or a movie) may be wound onto the cassette hub.

A control system synchronizes the motors that turn the winding spindle and the supply reel hub in order to maintain proper tension on the use tape during the winding operation. After the correct amount of use tape is wound onto the cassette hub, the use tape is cut and the cut section of the use tape is spliced to the remaining leader piece. The now completely loaded cassette is ejected or removed from the tape winding unit and a subsequent empty cassette is inserted. The tape loading and winding operation is then repeated.

Initially, cassette loaders required manual insertion of each individual cassette and manual placement of the leader over the splicing blocks. Likewise, the filled cassette had to manually be ejected from the loading position. Subsequently, mechanisms have been developed to automatically feed cassettes into the tape winding unit, automatically extract the leader from the cassette, and automatically eject the cassette. Further, in order to reduce equipment down time and increase efficiency, cassette loading machines with two hubs capable of supporting two supply reels were developed. These so called "double pancake" machines eliminated down time that occurred when the single supply reel was out of use tape. With a double pancake machine, the empty supply reel is simply replaced while the second supply reel is in use.

Further automation of this process has occurred within the last few years. Systems now exist with conveyors which provide a semi-continuous flow of empty cassettes to a tape loading machine. The conveyors of these systems are located in front, over the top and to the side of the tape loading machine. They frequently prevent the machine from being easily accessed or removed for maintenance. Further, such systems incorporate standard tape loading machines which require the cassette to be dropped or slid from an input conveyor into the machine's magazine. This drop or slide into the magazine can mar the cassette case. Further, because a magazine is being filled, the machine must rely on the conveyor to maintain the cassette supply. There is no direct interaction between the machine and a cassette supply mechanism.

OBJECTS OF THE INVENTION

A primary object of the present invention is to provide a continuous feed and discharge flow through cassette tape loader.

Another object is to provide a cassette loading machine capable of removing empty cassettes from a conveyor, bringing them through the machine and maintaining such cassettes wholly within the control of the machine until returned to a conveyor after loading.

An additional object is to provide a cassette tape loading system having independent conveyor(s) located adjacent to a cassette loading machine such that access to the machine is unimpeded for maintenance or removal purposes.

A further object is to provide a high production, high capacity cassette loading system that minimizes labor costs by limiting the need for human intervention.

A still further object is to provide a tape loading machine that handles cassettes gently so that the casing of the cassettes is not marred during the infeed transport, loading and outfeed transport operations.

Yet another object is to provide a completely automated cassette loading system including automatic placement of empty cassettes on a supply conveyor, automatic loading of empty cassettes and automatic packing of loaded (full) cassettes.

SUMMARY OF THE INVENTION

The automatic cassette loading system of the present invention has a remote loading station where cassettes are placed or fed onto a supply conveyor by manual or automatic means. The blank cassettes travel on the supply conveyor away from the remote loading station to a flow control station where they form a queue behind a release mechanism. (The flow control station is unnecessary if the cassettes are fed onto the supply conveyor by automatic means responsive to electronic signals from a tape loading machine.) The release mechanism releases cassettes from the queue one at a time in response to a signal from a tape loading machine in need of an empty cassette. The cassette then travels on the supply conveyor towards the tape loading machine. If more than one machine calls for a cassette at the same time, the cassettes are released one right after another at a predetermined distance or time interval.

Sensors connected to the tape loading machine detect when a blank cassette is near the machine on the supply conveyor. When the sensors signal that a cassette is nearby a pick-up arm is raised which removes the empty cassette from the supply conveyor. The arm raises the cassette off the conveyor and then slides it gently onto an in-feed conveyor which carries the cassette into the cassette loading machine.

The empty cassette moves on the in-feed conveyor until it comes to the end of the conveyor or abuts a cassette already on the conveyor. When the tape loading machine is ready, the cassette on the end of the in-feed conveyor is rotated 90° until it rests on a top support surface of a moveable support means. The support means lowers the empty cassette into a receptor means which grasps the cassette. The receptor means pulls the cassette inwardly into a tape loading station where the leader is first extracted from the empty cassette and then cut into two pieces. The leading end of tape from a supply reel of use tape is spliced to one free end of the leader. A predetermined amount of use tape is then wound into the cassette by a winding mechanism. The use tape is then cut and the second, remaining end of the leader is spliced to the use tape.

While the cassette is in its inward, loading position, the support means moves back up to its starting position where it supports the next empty cassette rotated down from the in-feed conveyor. After the cassette is completely loaded with tape, the receptor means moves it outwardly onto a second, lower support surface of the support means. The support means moves downwardly bringing a new empty cassette into the loading position and simultaneously bringing the now full cassette to a point where it is rotated 90° onto an out-feed conveyor.

The full cassette is carried by the out-feed conveyor, through the machine, toward a discharge conveyor. Before the full cassette is released onto the discharge conveyor, a sensor means, attached to the tape loading machine, scans the conveyor to insure that no other cassettes will interfere with the full cassette's release. If the sensor detects no other cassettes in the release area, the full cassette is carried to the end of the out-feed conveyor and dropped gently onto the discharge conveyor. Full cassettes are carried by the discharge conveyor to a manual or automatic remote packing station which may include a labeling mechanism and/or boxing mechanism. The whole process repeats itself, thereby providing a continuous feed and discharge cassette loading operation.

BRIEF DESCRIPTION OF THE DRAWINGS

FIG. 1 is a front elevational view of the flow through machine of the present invention.

THE DETAILED DESCRIPTION OF THE PREFERRED EMBODIMENT

Figure 2:
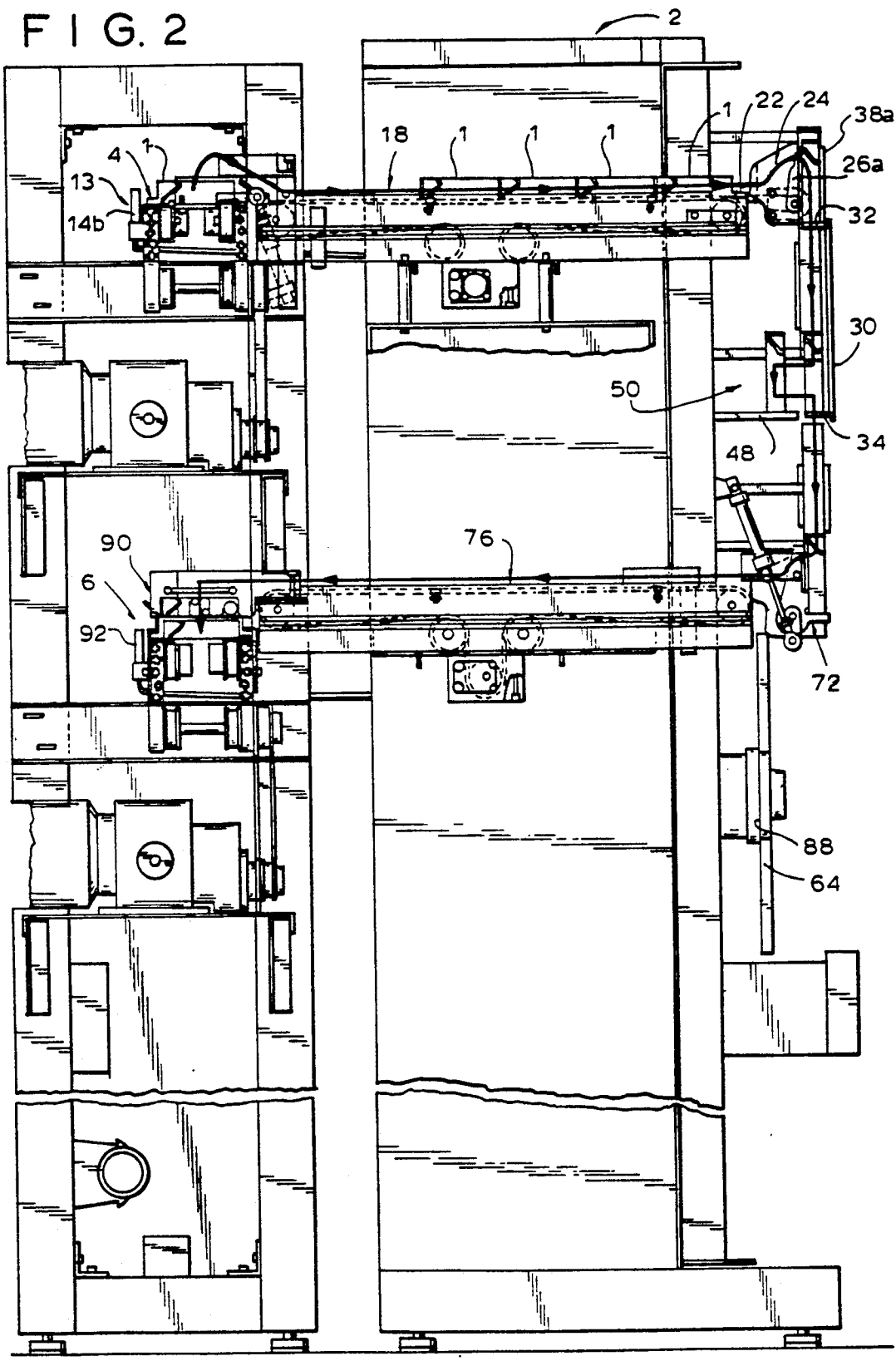
FIG. 2 is a side elevational view of the flow through machine of the present invention.
Figure 3:
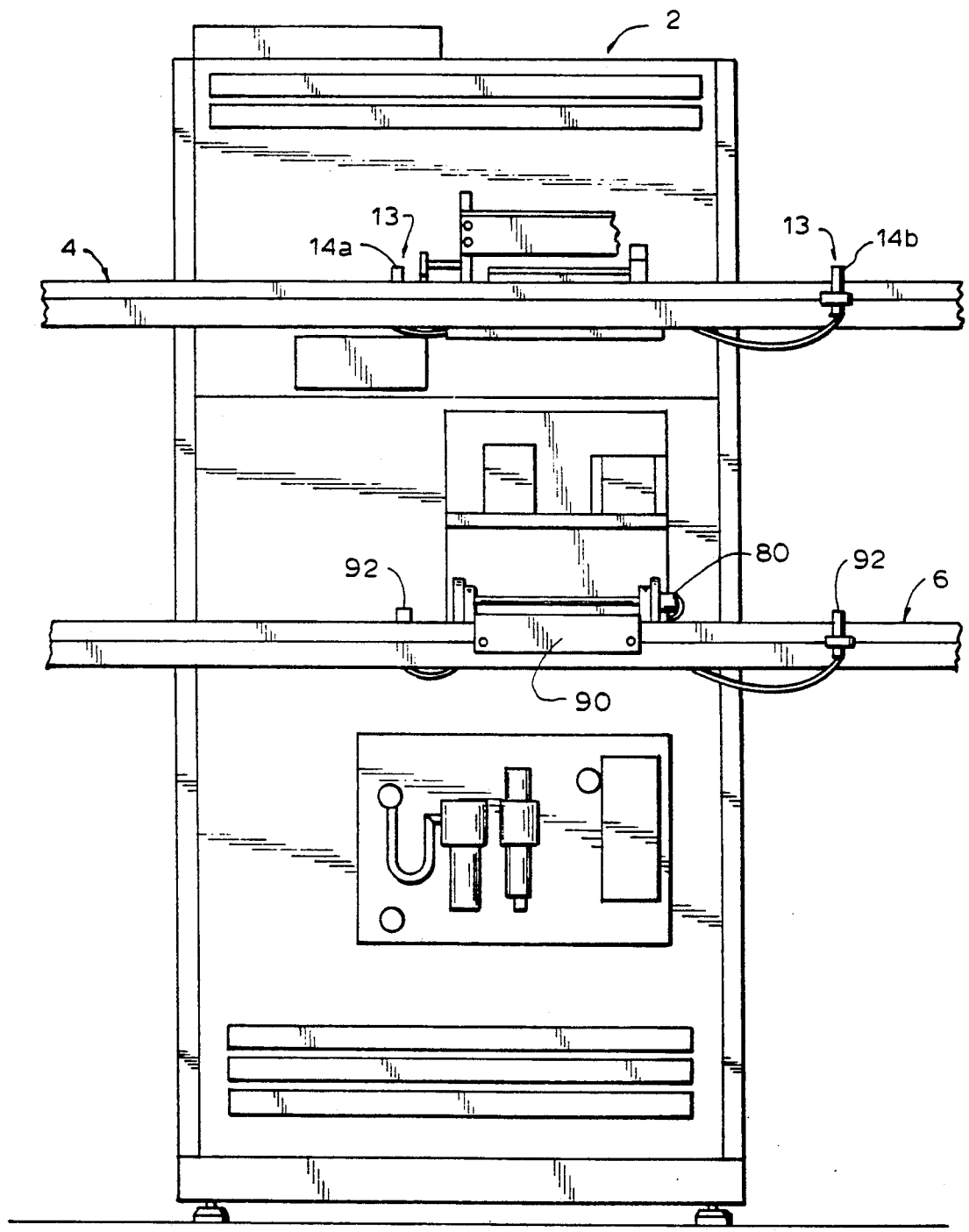
FIG. 3 is a rear elevational view of the flow through machine of the present invention.
Figure 4:
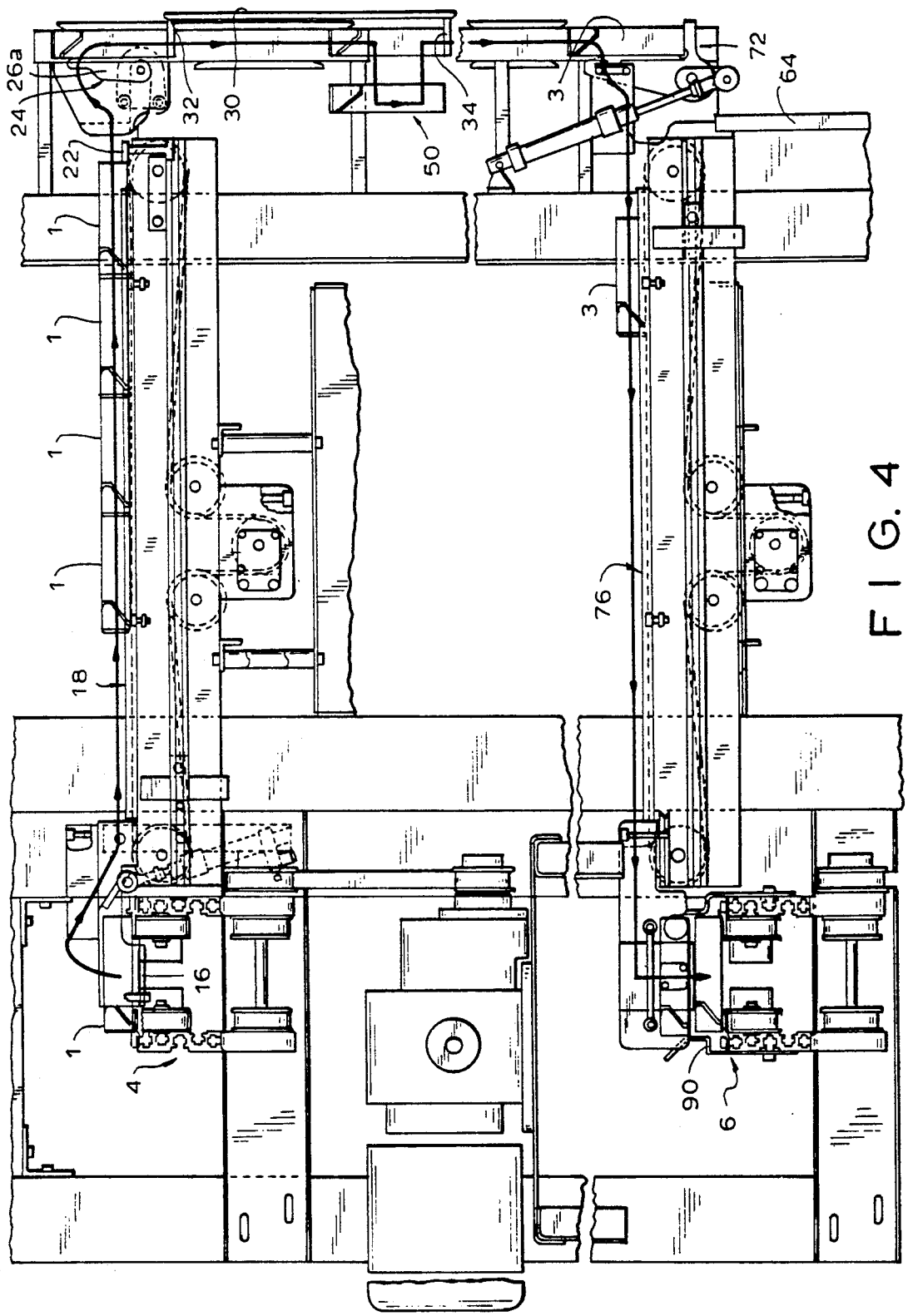
FIG. 4 is an enlarged side, cross-sectional view of the flow path of a cassette through the flow through machine of the present invention.
Figure 5:
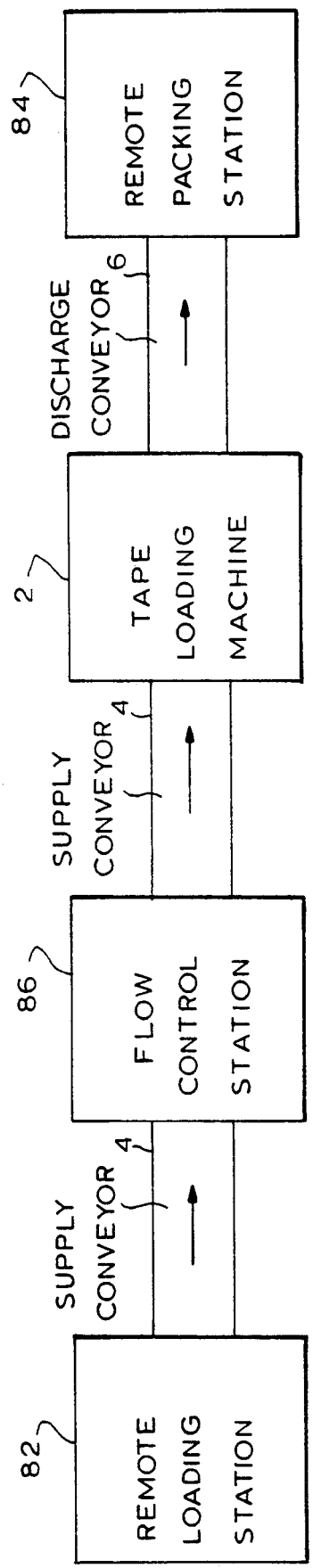
FIG. 5 is a schematic representation of the continuous feed and discharge cassette loading system of the present invention.

Referring to FIG. 1 and FIG. 5, empty cassettes 1 are placed on a cassette supply conveyor 4 at a remote loading station 82. The empty cassettes 1 are placed on the cassette supply conveyor 4 at the remote loading station 82 by manual means (i.e. human hands), automatic means (e.g. a high density stacker/feeder) or by direct feed out of a cassette assembly machine (not shown). Once the cassettes 1 are placed on the supply conveyor 4 they move along unimpeded until they come to a flow control station 86. At the flow control station 86, a release means (not shown), releases the cassettes 1 one at a time, in response to an electronic "call" from a cassette loading machine 2. (The flow control station 86 is unnecessary if an automatic means responsive to machine "calls" is employed.) A number of cassettes 1 may form a queue behind the cassette release mechanism at the flow control station 86 if the "calls" from the cassette loading machines 2 do not keep up with the incoming supply of cassettes 1 from the remote loading station 82. Because cassettes are likely to back up on the supply conveyor 4 at the flow control station 86, a conveyor belt of a material which does not mar the cassette shell is employed.

As indicated above, the release mechanism releases cassettes 1 in response to a "call" from a cassette loading machine 2. Each machine 2 "calls" for cassettes 1 until it reaches its capacity. The machine 2 is at capacity when six cassettes 1 are within its direct control. If a number of cassette loading machines 2 request cassettes 1 at the same time, the release mechanism release cassettes 1 from the queue, one at a time, in a predetermined time sequence.

When the machine 2 calls for a cassette, an L-shaped pick-up arm 16 drops down to the supply conveyor 4. Photo electric sensor means 13 which comprises elements 14a and b, is mounted on the supply conveyor 4, adjacent to each cassette loading machine 2. Sensor means 13, indicates when the conveyor 4 is clear so the arm 16 doesn't hit a passing cassette 1 when it drops down to the conveyor 4. The arm 16, which is made of aluminum sprayed with nylon paint, raises a cassette 1 off the supply conveyor 4 when a sensor, mounted on the arm 16 (not shown), indicates the cassette 1 is completely on the arm 16. The arm 16 raises the cassette 1 until it reaches an angle of approximately 45° above an in-feed conveyor 18. At that point the cassette 1 slides gently onto the in-feed conveyor 18, the beginning of which is located at the back of the cassette loading machine 2. If the in-feed conveyor 18 is full, the cassette 1 remains on the arm 16 and the sensor indicates that the machine 2 is full. The in-feed conveyor 18 carries the cassette 1 forward into the cassette loading machine 2 until it reaches the end of the conveyor 18 or abuts another cassette 1 already on the conveyor 18. At the end of the in-feed conveyor 18 is a stop mechanism 22 which holds the cassette(s) 1 in place on the conveyor 18 until the machine 2 "needs" another empty cassette 1. When the stop mechanism 22 releases the cassette 1 an upper rotation mechanism 24, comprised of two turn members 26a and b having a bar 28 between them, rotates the cassette 1 approximately 90° to a vertical position. A pair of vertical stop pieces 38a and b maintain the cassette 1 in a vertical position. The cassette 1 is also supported by a plurality of top support pins 32 which are part of a moveable support cage 30. The support cage 30 is driven by a belt 31 and rides on rails 36a and b which guide the cage 30 up and down along the face of the machine 2.

The support cage 30 lowers the empty cassette 1 through a pair of upper guide pieces 40a and b into two U-shaped arms 46a and b which hold the cassette 1 on either side. The cassette 1 is then pulled inwardly into a loading station 50 by the arms 46a and b, where it rests on loading station supports 48. At the loading station 50 an extractor 52 removes the leader (not shown) from the cassette 1 and places it in a groove (not shown) in a block 54 and also in a contiguous first groove (not shown) in an adjacent block 56. A cutter 58, cuts the leader into two separate pieces. One end of the leader remains on the block 54 and the second end remains in the first groove on the block 56. At least one reel of use tape 64 is located on at least one hub 88 on the front of the machine 2. The free end of the use tape 64 is wound through a series of guide rollers 70, and a control means 68 and is ultimately placed in a second groove (not shown) on the block 56.

The block 56 is shifted to bring the second groove, having the free end of the use tape 64 therein, into alignment with the single groove on the block 54. The free end of the use tape 64 is then spliced, with a splicing mechanism 60, to the end of the leader which is on the block 54. A wind spindle 62 fits in a hub 90 of the cassette and winds a predetermined amount of use tape 64 into the cassette 1. When the winding process is complete, the cutter 58 cuts the use tape 64 leaving one free end in the single groove of the block 54 and the second free end in the second groove of the block 56. The block 56 then shifts to bring the second end of the leader, which is in the first groove of the block 56, into alignment with the end of the use tape now in the single groove of block 54. The splicing mechanism 60 then applies a splice that joins the end of the leader to the end of the use tape 64 now in the cassette 1. The wind spindle 62 then "jogs" the cassette hub to bring all the remaining tape into the cassette 1 and off the blocks 54 and 56. At this point the cassette 1 is completely loaded. The now full cassette 3 is pushed outwardly to its original position away from the loading station 50 by U-shaped arms 46a and b.

While the cassette 1 is in the loading station 50, the moveable support cage 30 returns to its top position to receive (support) the next empty cassette 1. Thus, when the U-shaped arms 46a and b return the full cassette 3 to the outer, starting position, the cassette 3 is placed on a pair of bottom support pins 34 on the lower part of the support cage 30. The support cage 30 then travels downwardly to its second, lower position bringing a new empty cassette 1 into the U-shaped arms 46a and b. At the same time, this brings the full cassette 3 to a lower rotation member 72 which rotates the cassette approximately 90° to a horizontal position, thereby placing it on an out-feed conveyor 76. The out-feed conveyor 76 carries the full cassette 3 back through the machine 2 towards a discharge conveyor 6. Photoelectric sensors 92, which are connected to the machine 2, scan the conveyor 6 to insure that no cassette will interfere with the release of a full cassette 3 from the out-feed conveyor 76. If there is no obstruction, the full cassette 3 is carried to the end of the out-feed conveyor 76 and gently released by a release mechanism 80 through a guide chute 90 onto the discharge conveyor 6.

The discharge conveyor 6 carries the full cassette 3 to a remote packing station 84. The remote packing station 84 can include automated boxing and labeling devices as well as an automatic or manual packing system.

While the tape loading machine 2 of the present invention is primarily designed for handling video cassettes this system can easily be adapted to accommodate audio or computer cassettes.

Although the present invention has been described with reference to specific embodiments, neither the described dimensions, nor the materials mentioned should be construed as limited to the details disclosed herein, as the disclosed embodiments are merely illustrative of the invention.

I claim:

1. A cassette loading machine having a front and back comprising:
    in-feed conveyor means for automatically receiving empty cassettes taken from a cassette supply conveyor and for automatically bringing empty cassettes from the back of the cassette loading machine, through the cassette loading machine, to the front of the cassette loading machine;
    moveable support means for automatically receiving empty cassettes from said in-feed conveyor means at a first position, moving the empty cassettes from said first position to a second position in which the empty cassettes can be advanced to a loading position and moving full cassettes from said second position to a third position;
    loading means for automatically loading a predetermined length of tape into a cassette at said loading position; out-feed conveyor means receiving cassettes at said third position from said moveable support means, wherein said out-feed conveyor means automatically carries the full cassettes from the front of the cassette loading machine, through the cassette loading machine, to the back of the cassette loading machine to a cassette discharge conveyor.

2. An apparatus according to claim 1, further comprising:
    first cassette rotation means, wherein said first cassette rotation means rotates cassettes approximately 90° automatically transferring the cassettes from said in-feed conveyor means to an upper support area of said moveable support means; loading station transport means, for automatically moving cassettes from said upper support area of said moveable support means to said loading station and from said loading station to said lower support area of said moveable support means; and second cassette rotation means, wherein said second cassette rotation means rotates cassettes approximately 90° automatically transferring cassettes from said lower support area to said out-feed conveyor means.

3. An apparatus according to claim 2, wherein the cassette loading machine further comprises:
    first sensor means for automatically detecting and electronically signalling the presence of a cassette located on the external source, near said in-feed conveyor means;
    pick-up means for automatically picking up cassettes from the external source and transferring the cassettes to said in-feed conveyor means, wherein said pick up means is responsive to said electronic signals from said first sensor means; and
    second sensor means for automatically detecting and electronically signalling the presence of a cassette on the external discharge means, near said out-feed conveyor means.

4. An apparatus according to claim 3, wherein said pick up means is an L-shaped moveable arm.

5. An apparatus according to claim 4, wherein said moveable support means is moveable on first and second guide rails.

6. An apparatus according to claim 5, wherein said moveable support means is driven on said first and second guide rails by a belt.

7. An apparatus according to claim 3, wherein said in-feed conveyor means includes a stop mechanism for regulating the movement of empty cassettes to said moveable support means.

8. A cassette loading system comprising: a supply conveyor for transporting empty cassettes from a remote location; a remote loading station at which empty cassettes are automatically placed on said supply conveyor; a cassette tape loading machine capable of removing empty cassettes from said supply conveyor, transporting the empty cassettes through said loading machine in a first direction, loading the empty cassettes with tape, and transporting the full cassettes through said loading machine in a second direction; a discharge conveyor capable of receiving loaded cassettes from said cassette loading machine and carrying loaded cassettes to a remote location; and a remote packing station at which loaded cassettes are automatically removed from said discharge conveyor and packed wherein said cassette tape loading machine comprises:

- an in-feed conveyor for bringing empty cassettes from said supply conveyor into and through said cassette loading machine;
- moveable support means for automatically receiving empty cassettes from said in-feed conveyor at a first position, moving the empty cassettes from said first position to a second position in which the empty cassettes can be advanced to a loading position and moving full cassettes from said second position to a third position;
- winding means for automatically winding a predetermined length of tape into an empty cassette at said loading position;
- out-feed conveyor means receiving cassettes at said third position from said moveable support means wherein said out-feed conveyor automatically carries the full cassettes through said loading machine to said discharge conveyor.

9. A system according to claim 8, further comprising:
- first cassette rotation means, wherein said first cassette rotation means rotates cassettes approximately 90° automatically transferring the cassettes from said in-feed conveyor means to an upper support area of said moveable support means;
- loading station transport means, for automatically moving cassettes from said upper support area of said moveable support means to said loading station and from said loading station to a lower support area of said moveable support means; and
- second cassette rotation means, wherein said second cassette rotation means rotates cassettes approximately 90° automatically transferring the cassettes from said lower support area to said out-feed conveyor.

10. A system according to claim 9, wherein said cassette loading machine further comprises:
- first sensor means mounted on said in-feed conveyor for automatically detecting and electronically signalling the presence of a cassette on said supply conveyor means, near said in-feed conveyor, to said loading machine;
- pick-up means for automatically picking up cassettes from said supply conveyor and automatically transferring the cassettes to said in-feed conveyor, wherein said pick-up means is responsive to said electrical signal from said first sensor means; and
- second sensor means mounted on said discharge conveyor for automatically detecting and electronically signaling the presence of a cassette on said discharge conveyor means, near said out-feed conveyor means, to said loading machine.

11. A system according to claim 10, wherein said supply conveyor and said discharge conveyor are located behind said cassette loading machine.

12. A system according to claim 11, wherein said supply conveyor is located above and parallel to said discharge conveyor.

13. A system according to claim 12, wherein said pick-up means supports cassettes from underneath a downward facing surface of the cassettes.

14. A system according to claim 13, wherein said moveable support means is moveable on first and second guide rails.

15. A system according to claim 14, wherein said moveable support means is driven on said first and second guide rails by a belt.

16. A cassette loading machine comprising:
- first transfer means for automatically transferring cassettes from a supply conveyor to the cassette loading machine, wherein said supply conveyor is located behind the cassette loading machine;
- second transfer means for automatically transferring cassettes from the back of the cassette loading machine, through the cassette loading machine, to the front of the cassette loading machine;
- third transfer means for automatically transferring cassettes from said second transfer means to a moveable support means wherein said moveable support means automatically moves cassettes along the front of the cassette loading machine;
- fourth transfer means for automatically transferring cassettes from said moveable support means to a fifth transfer means, wherein said fifth transfer means automatically transfers the cassettes from the front of the cassette loading machine, through the cassette loading machine, to the back of the cassette loading machine; and
- sixth transfer means for automatically transferring cassettes from the cassette loading machine to a discharge conveyor, wherein the discharge conveyor is located behind the cassette loading machine.

17. An apparatus according to claim 16, wherein said first transfer means comprises a moveable arm.

18. An apparatus according to claim 17, wherein said second transfer means comprises an in-feed conveyor.

19. An apparatus according to claim 18, wherein said fifth transfer means comprises an out-feed conveyor.

20. An apparatus according to claim 16, wherein said third transfer means comprises at least one turn member for rotating cassettes approximately 90° from a substantially horizontal position to a substantially vertical position.

21. An apparatus according to claim 16, wherein said fourth transfer means comprises at least one turn member for rotating cassettes approximately 90° from a substantially vertical position to a substantially horizontal position.

22. An apparatus according to claim 16, wherein said sixth transfer means comprises a release mechanism.

23. A method for loading and handling cassettes comprising the following steps:
- placing empty cassettes on a supply conveyor at a remote location;
- automatically queuing empty cassettes on said supply conveyor behind a flow control device; signalling the need for at least one empty cassette to be loaded with tape;

automatically releasing cassettes from the quene in response to the signals;

automatically transporting empty cassettes on said supply conveyor from the quene to a cassette loading machine;

automatically removing empty cassettes from said supply conveyor with a cassette loading machine;

automatically transporting empty cassettes through a cassette loading machine from the machine's back to its front;

loading empty cassettes with tape;

automatically transporting loaded cassettes from the front of a cassette loading machine, through the machine, to the back of said loading machine;

automatically transferring loaded cassettes to a discharge conveyor;

automatically transporting loaded cassettes to a remote packing station; and packing loaded cassettes.

24. A cassette loading system comprising:

first transfer means for automatically transferring empty cassettes from a remote location to a location near a cassette loading machine;

second transfer means for automatically transferring empty cassettes from said first transfer means to said cassette loading machine;

first transport means for transporting empty cassettes through said cassette loading machine; third transfer means for automatically transferring cassettes from said first transport means to a winding station associated with said cassette loading machine where the empty cassettes are loaded with tape, and for thereafter automatically transferring the loaded cassettes to a fourth transfer means for automatically rotating the loaded cassettes approximately 90° and transferring them to a second transport means for transporting cassettes through said cassette loading machine; and sixth transfer means for automatically transferring cassettes from said cassette loading machine to a seventh transfer means for transferring cassettes to a remote location.

25. An apparatus according to claim 24, wherein said first transfer means comprises a cassette supply conveyor.

26. An apparatus according to claim 24, wherein said second transfer means comprises an L-shaped pickup arm.

27. An apparatus according to claim 24, wherein said first transport means comprises an in-feed conveyor.

28. An apparatus according to claim 24, wherein said third transfer means comprises:

a support cage; and a plurality of U-shaped moveable arms operatively associated with said support cage.

29. An apparatus according to claim 24, wherein said fourth transfer means comprises at least one turn member.

30. An apparatus according to claim 24, wherein said second transport means comprises an out-feed conveyor.

31. An apparatus according to claim 24, wherein said sixth transfer means comprises a release mechanism.

32. An apparatus according to claim 24, wherein said seventh transfer means comprises a cassette discharge conveyor.

33. A cassette loading system comprising:

rear cassette receiving means for automatically receiving cassettes from a cassettes supply conveyor, wherein said supply conveyor is located, at least in part, to the rear of a cassette loading machine;

first transfer means for automatically transferring said received cassettes from the rear of a cassette loading machine to the front of said cassette loading machine;

transport means for automatically moving cassettes in a substantially vertical manner along the front of a cassette loading machine to and from a loading station associated with said cassette loading machine;

loading means located at said loading station for loading empty cassettes with tape;

second transfer means for receiving loaded cassettes from said transport means and automatically transferring said loaded cassettes from the front to the rear of a cassette loading machine; and rear discharge means for automatically discharging loaded cassettes to a cassette discharge conveyor located at the rear of said cassette loading machine.

34. An apparatus according to claim 33, wherein said first transfer means comprises an in-feed conveyor.

35. An apparatus according to claim 33, wherein said transport means comprises:

a support cage; and a plurality of U-shaped moveable arms operatively associated with said support cage.

36. An apparatus according to claim 33, wherein said second transfer means comprises an out-feed conveyor.

37. An apparatus for delivering and transferring a cassette to a loading machine comprising:

a conveyor for moving cassettes from a remote location to a position near a loading machine, wherein said conveyor comprises a plurality of movable support belts which support cassettes substantially on either side leaving the middle of the cassettes unsupported;

pickup means for picking up cassettes from said conveyor, wherein said pickup means is moveable between a first cassette pickup position between said plurality of movable support belts of said conveyor means and a second transfer position for transferring cassettes to a loading machine;

a sensor for generating a signal in response to the detection of a cassette such that said pickup means moves the detected cassette from said first position to said second position in response to said signal.

38. A tape loading system comprising:

a cassette supply conveyor for transporting empty cassettes from a remote location, wherein said supply conveyor has a plurality of spaced apart belts;

a cassette discharge conveyor parallel to and vertically disposed from said supply conveyor; at least one tape loading machine located adjacent to said supply and discharge conveyors; pickup means for automatically transferring cassettes from said supply conveyor to said tape loading machine, wherein said pickup means moves from a first pickup position between at least two of said plurality of spaced apart belts to a second transfer position to transfer cassettes to said tape loading machine.

39. A tape loading system according to claim 38, wherein said pickup means is pivotally moveable between said first and second positions.

40. A tape loading system according to claim 39, wherein said supply conveyor is above said discharge conveyor.

41. A tape loading system according to claim 39, wherein said supply conveyor and said discharge conveyor are located behind said tape loading machine.

42. A tape loading system according to claim 39, wherein at least a portion of said pickup means is below at least two of said plurality of spaced apart support belts when said pickup means is in said first position.

43. A tape loading system according to claim 39, wherein said first pickup position is below said second transfer position.

44. A tape loading system according to claim 38, wherein said pickup means supports cassettes from underneath a downward facing surface of the cassettes during the movement of said pickup means from said first position to said second position.

45. A method for delivering a cassette to a tape loading machine from a remote location comprising the steps of:
   placing cassettes on a conveyor having a plurality of spaced apart moveable support belts;
   automatically transporting the cassettes on said conveyor from a remote location to a location adjacent one or more tape loading machines;
   automatically generating a signal in response to the detection of the presence of a cassette;
   automatically picking up cassettes from said conveyor with a pickup means in response to said signal, wherein at least a portion of said pickup means is initially located between at least two of said plurality of moveable support belts; and
   automatically transferring cassettes from said pickup means to the tape loading machine.

46. A method of loading cassettes comprising the steps of:
   placing cassettes on a supply conveyor at a remote location;
   automatically transporting cassettes on said supply conveyor to at least one tape loading machine located adjacent to a portion of said supply conveyor;
   automatically picking up cassettes from said supply conveyor with a pickup means operatively associated with said tape loading machine;
   automatically transferring cassettes from said pickup means to said tape loading machine; reorienting cassettes from a substantially horizontal position to a substantially vertically position;
   automatically loading cassettes with tape at a loading station associated with said tape loading machine, wherein said loading station is located below said supply conveyor;
   reorienting cassettes from a substantially vertical position to a substantially horizontal position; and
   automatically transferring loaded cassettes from said tape loading machine to a discharge conveyor which is vertically displaced from and parallel to said supply conveyor.

47. A cassette loading system comprising:
   a tape loading machine capable of generating signals to indicate the need for empty cassettes to be filled;
   first transport means for automatically transporting empty cassettes from a remote location to said tape loading machine in response to the generated signals;
   first transfer means for automatically transferring empty cassettes from said first transport means to said tape loading machine;
   means associated with said tape loading machine for reorienting empty cassettes from a substantially horizontal position to a substantially vertical position;
   a tape winding station associated with said tape loading machine capable of automatically extracting the leader from a substantially vertically oriented cassette, cutting said leader, splicing a free end of use tape to one end of said cut leader and loading empty cassettes with use tape;
   means associated with said tape loading machine for reorienting full cassettes from a substantially vertical position to a substantially horizontal position; and
   second transfer means for automatically transferring full cassettes from said tape loading machine to a second transport means for transporting full cassettes away from said tape loading machine, wherein said second transfer means is parallel to and vertically spaced from said first transfer means.

48. A cassette loading system comprising:
   a cassette supply conveyor;
   a tape loading machine adjacent to said cassette supply conveyor;
   rotational pick up means for removing empty cassettes from said cassette supply conveyor and transferring them to said tape loading machine by rotating said cassettes through an arc in a substantially vertical plane;
   first transfer means for advancing cassettes received from said pickup means toward and away from a cassette loading station;
   second transfer means, operatively associated with said first transfer means, for advancing full cassettes to a cassettes discharge conveyor located adjacent said tape loading machine.

49. A cassette loading system according to claim 48, wherein said cassette discharge conveyor is parallel to said cassette supply conveyor.

50. A cassette loading system according to claim 49, wherein said cassette supply conveyor is above said cassette discharge conveyor.

51. A cassette loading system according to claim 48, wherein said rotational pickup means supports empty cassettes from underneath a downward facing surface of the cassette while rotating through said arc.

52. A cassette loading system comprising:
   supply conveyor means for automatically transporting empty cassettes from a remote location to a position adjacent a tape loading machine;
   means, operatively associated with said tape loading machine, for automatically picking up empty cassettes from said supply conveyor means and automatically transferring the empty cassettes to said tape loading machine;
   means for automatically reorienting cassettes from a substantially horizontal position to a substantially vertical position;
   means for automatically loading the empty cassettes with tape at a loading station, associated with said tape loading machine, wherein said loading station is located below said supply conveyor; and
   means for automatically transferring loaded cassettes from said tape loading machine to a discharge conveyor which is adjacent to said tape loading machine and which is vertically displaced from and parallel to said supply conveyor.

* * * * *